United States Patent [19]

Crandall

[11] Patent Number: 4,747,974

[45] Date of Patent: May 31, 1988

[54] MIXED CR$_2$O$_3$ PASTE FOR CRO$_2$ SYNTHESIS

[75] Inventor: Terry G. Crandall, Wilmington, Del.

[73] Assignee: E. I. DuPont de Nemours and Company, Wilmington, Del.

[21] Appl. No.: 3,401

[22] Filed: Jan. 28, 1987

Related U.S. Application Data

[63] Continuation-in-part of Ser. No. 845,734, Mar. 28, 1986, abandoned.

[51] Int. Cl.$^4$ .......................................... C01G 37/027
[52] U.S. Cl. ................................... 252/62.51; 423/607
[58] Field of Search ..................... 252/62.51; 423/607

[56] References Cited

U.S. PATENT DOCUMENTS

| | | | |
|---|---|---|---|
| 3,278,263 | 10/1966 | Cox | 23/145 |
| 4,045,544 | 8/1977 | Williston et al. | 423/607 |
| 4,524,008 | 6/1985 | Chen | 252/62.56 |

*Primary Examiner*—Jack Cooper

[57] ABSTRACT

Chromic acid and inexpensive, coarse grained Cr$_2$O$_3$ are dissolved in water prior to adding more costly fine grained Cr$_2$O$_3$ to produce chrome pastes which are more economical than pastes prepared by prior art techniques employing only fine grained Cr$_2$O$_3$. The pastes are equivalent to prior art pastes when reacted to form chromium dioxide.

7 Claims, No Drawings

MIXED $Cr_2O_3$ PASTE FOR $CrO_2$ SYNTHESIS

CROSS REFERENCE TO RELATED APPLICATIONS

This application is a continuation-in-part of U.S. patent application Ser. No. 845,734, filed Mar. 28, 1986, now abandoned.

FIELD OF THE INVENTION

The present invention relates to a process for the synthesis of ferromagnetic chromium dioxide from a paste of hexavalent and trivalent chromium oxides. More particularly, the present invention economically employs fine and coarse grained $Cr_2O_3$ raw materials in the process.

BACKGROUND OF THE INVENTION

It has been known in the art since U.S. Pat. 3,278,263 to prepare a viscous paste for synthesis of chromium dioxide by combining chromium trioxide ($CrO_3$), chromic oxide ($Cr_2O_3$) and water. The $Cr_2O_3$ component is typically obtained by the thermal decomposition of expensive ammonium dichromate. U.S. Pat. No. 4,045,544, disclosed that this viscous paste could be productively heated in an annular can under pressure to produce ferromagnetic chromium dioxide. Yet, despite continued efforts to reduce manufacturing costs, ferromagnetic chromium dioxide remains more expensive to produce than iron oxide-based products.

SUMMARY OF THE INVENTION

A lower cost process for ferromagnetic chromium dioxide manufacture involves the steps:

(a) Dissolving $CrO_3$ and coarse grained $Cr_2O_3$ in water;

(b) Adding fine grained $Cr_2O_3$ to the solution to prepare a paste with undissolved fine grained $Cr_2O_3$;

(c) Reacting the paste at elevated temperature and pressure.

In a preferred process one part $CrO_3$ by weight is employed with 0.25 to 1.33 parts by weight water and 0.25 to 0.75 parts by weight $Cr_2O_3$, and coarse grained $Cr_2O_3$ comprises 20 to 80 percent of the total $Cr_2O_3$ added. Also antimony oxide is added, in a chromium trioxide solution, during step (1) or (2).

DETAILED DESCRIPTION OF THE INVENTION

The capability to use less expensive raw materials without sacrificing final product quality is a long sought objective in the manufacture of ferromagnetic chromium dioxide. As a result, raw materials with potential for cost savings are continuously being evaluated for their utility in manufacture. It is often the case that these "low cost" materials function acceptably in the synthesis, but yield product with inferior performance in one or more important applications. This has been the situation in chromium dioxide manufacture with respect to the use of coarse grained $Cr_2O_3$.

A very large supply exists for coarse grained $Cr_2O_3$ with low specific surface area. This product, typically having a specific surface area below 10 $m^2/g$, is essentially a refined chromite ore that may have been further purified by chemical processing. This material is used to supply such commodity markets as the pigment and ceramics industries. Attempts to use this material in chromium dioxide synthesis in the past have led to product possessing unacceptably low coercivity, magnetic moment, and surface area. Until now, the only way to achieve the required physical and magnetic properties was to use high surface area, fine grained $Cr_2O_3$ obtained by the costly and potentially hazardous process of thermal flash decomposition of ammonium dichromate. In this process, ammonium dichromate is conveniently fed into a rotary kiln where it is advanced through staged heating zones wherein the ammonium dichromate is heated to approximately 500° to 600° C. during a 5 to 15 minute period. This route yields $Cr_2O_3$ with specific surface area of 40 to 55 $m^2/g$, typically 45 to 50 $m^2/g$.

It has now been discovered that chromium dioxide fully equivalent to prior art processes can be made using, as one component, inexpensive, coarse grained $Cr_2O_3$ and, as a second component, high surface area $Cr_2O_3$ obtained via ammonium dichromate decomposition. It has been found that up to 80 percent of the total $Cr_2O_3$ requirement can be met with the coarse grained form with no detrimental effect on quality.

Successful substitution requires that the coarse grained form be added initially during paste production, and that no fine grained material be present during this stage. The mixture is heated and stirred until all or essentially all of the coarse grained material has dissolved. Only then can the fine grained form be added. The requirement for prior dissolution of coarse material arises from the dual role played by $Cr_2O_3$ in chromium dioxide synthesis. Part of the $Cr_2O_3$ dissolves during paste production to produce an inorganic polymer consisting of $Cr(+6)$, $Cr(+3)$, and water. Part also remains undissolved as a fine, colloidal suspension in the thick paste product. The undissolved fraction functions to provide seed crystals during subsequent conversion to chromium dioxide at high temperature and pressure. Thus, it contributes to the fine grained nature of chromium dioxide. When both coarse and fine grained material are present at the same time, the fine grained material dissolves preferentially due to its higher dissolution rate. If this should occur, the insoluble component of $Cr_2O_3$ is of the coarse grained variety, which gives rise to very large crystals of chromium dioxide. Resulting crystals possess inferior physical and magnetic properties.

Complete replacement of fine grained $Cr_2O_3$ with coarse grained material is not desirable for at least two reasons. The first is that some fine grained $Cr_2O_3$ is required to provide nucleation seed crystals as described above. The second relates to production efficiencies. As a general rule, it is desirable to minimize the water content of pastes in order to maximize the amount of chromium dioxide produced per paste batch. But the solubility of $Cr_2O_3$ is in part related to the amount of water present. In order to dissolve a full complement of coarse grained $Cr_2O_3$, unproductive amounts of water would be required. Minor amounts of undissolved coarse grained material can be tolerated, but coercivity generally will decrease as the level of undissolved material increases. The level of undissolved material can readily be reduced by increasing the temperature of the solution as high as 100° C., or increasing the time for the coarse component to dissolve (up to 2 hours, for example), before adding the fine grained $Cr_2O_3$ component to the solution.

Substitution of coarse grained material generally will be limited to approximately 80% by weight of the total $Cr_2O_3$. Although advantages are obtained at lower levels, coarse grained $Cr_2O_3$ generally will be employed at levels of at least 20% by weight of total $Cr_2O_3$ to obtain full advantage of the invention. Addition of coarse grained material in the range of 30% to 60%, by weight, is preferred.

As a result of the present process, a means has been found to use an inexpensive, commodity source of low surface area $Cr_2O_3$ in a way which is not detrimental to the chromium dioxide produced and which offers the opportunity for significant cost savings. The difference in price between the two sources of $Cr_2O_3$ is substantial; the purchase price of coarse grained material currently is about 60 percent of the cost of manufacture of $Cr_2O_3$ produced by ammonium dichromate decomposition.

Following production of paste as described above, the paste is converted to ferromagnetic chromium dioxide by heating under pressure, as disclosed in U.S. Pat. No. 4,045,544 incorporated herein by reference. Temperatures in the range of 300° to 400° C., and pressures in the range of 300 to 400 atmospheres typically are employed. Resulting chromium dioxide has industrial utility in manufacture of magnetic recording tapes.

The following examples serve to illustrate the present invention.

EXAMPLE 1

Chromic acid (476.1 g, 14.29 equiv.) and water (145 g) were added to a 1 liter beaker and stirred on a Cowles laboratory dissolver. The mixture was heated to 60° C. with a hot water bath and then 72.4 g $Cr_2O_3$ (2.86 equiv., equal to 40 percent of the total $Cr_2O_3$ paste requirement) with a specific surface area of 5.8 $m^2/g$ were added over 1 to 2 minutes. Mixing speed was adjusted to 1800 rpm and the mass was allowed to stir for 60 minutes during which the temperature rose to 95° C. due to the heat of solution and heat of reaction between $Cr(+6)$ and $Cr(+3)$. More water (36 g) was added and the mixture was cooled to 30° C. with a water bath. A sample of the paste was analyzed at this point for insoluble $Cr_2O_3$ content. The level of insoluble $Cr_2O_3$ was found to be 2.8 percent of that added. With continued stirring and cooling, $Sb_2O_3$ (0.9 g, 0.136 percent based on the weight of $CrO_3$ used), $Fe_2O_3$ (0.25 percent based on the weight of $CrO_3$ used) and 108.6 g (4.29 equiv.) of $Cr_2O_3$ with a specific surface area of 45 $m^2/g$ were added. The $Cr_2O_3$ addition took 5 minutes. Temperature of the mixture was then allowed to increase due to continued dissolution and paste polymer formation, until a final temperature of 75° C. was reached. The paste was transferred to a glass jar lined with a sheet of Teflon ® film and the Teflon ® pigtails were wired shut.

The paste thus prepared was converted to chromium dioxide in a commercial scale reactor at 350° C/ and 340 atmospheres over 12 hours. The reactor was prepressurized with air to one fifth of the reaction pressure, the remaining pressure being derived primarily from oxygen generated during the course of the conversion. The resulting crude clinker of aggregated chromium dioxide crystals was dried and micropulverized to yield 400 g (theory) of chromium dioxide.

|  | Properties | | | |
| --- | --- | --- | --- | --- |
|  | Hc,Oe | σs,emu/g | σr,emu/g | ssa,$m^2/g$ |
| CONTROL | 525 | 78.0 | 38.5 | 25.0 |
| SAMPLE | 585 | 76.7 | 37.7 | 29.0 |

The Control represents magnetic properties that will be obtained in commercial product having comparable levels of $Sb_2O_3$ and $Fe_2O_3$ additives.

EXAMPLE 2

The procedure of Example 1 was used except that the amounts of low and high ssa $Cr_2O_3$ were both 90.5 g (3.57 equiv.) and each constituted 50 percent of the total $Cr_2O_3$ required. The amount of insoluble low surface area $Cr_2O_3$ at the end of the 60 minute heating period was 12.0 percent of the amount added.

Properties:
Hc=547 Oe; σs=75.3 emu/g; σr=36.7 emu/g; ssa=27.5 $m^2/g$.

Magnetic properties obtained in Examples 1 and 2 are comparable to that of commercial products made using only fine-grained $Cr_2O_3$. While the invention has been described in the context of using fine grained $Cr_2O_3$ obtained by the thermal decomposition of ammonium dichromate, which typically has a specific surface area of 45 to 55 $m^2/g$, equivalent results may be achieved with fine grained $Cr_2O_3$ from other sources. For example, useful products can be achieved using appropriate quantities of $Cr_2O_3$ having specific surface areas as low as about 30 $m^2/g$.

I claim:

1. A process for producing ferromagnetic chromium dioxide consisting essentially of:
    (a) Dissolving in water $CrO_3$ and coarse grained $Cr_2O_3$ having a specific surface area below approximately 10 $m^2/g$;
    (b) Adding fine grained $Cr_2O_3$ having a specific surface area of at least approximately 30 $m^2/g$ to the solution to prepare a paste with undissolved fine grained $Cr_2O_3$; and
    (c) Reacting the paste at about 300° C. to 400° C. and 300 to 400 atmospheres to form chromium dioxide; with the proviso that approximately 20 to 80% by weight of the $Cr_2O_3$ is added as coarse grained $Cr_2O_3$ in step (a) and the remainder is added as fine grained $Cr_2O_3$ in step (b).

2. The process of claim 1 wherein a crystal modifier is added to the paste.

3. The process of claim 2 wherein the modifier is antimony oxide.

4. The process of claim 3 wherein antimony oxide is added as a solution in concentrated $CrO_3$.

5. The process of claim 4 wherein approximately 30 to 60% of the $Cr_2O_3$ is added as coarse grained $Cr_2O_3$ in step (a).

6. The process of claim 5 wherein the fine grained $Cr_2O_3$ added in step (b) has a specific surface area of approximately 40 to 55 $m^2/g$.

7. The process of claim 1 wherein, by weight, 1 part $CrO_3$ is dissolved in 0.25 to 1.33 parts water in step (a), and a total of 0.25 to 0.75 parts of $Cr_2O_3$ are added in steps (a) and (b).

* * * * *